United States Patent [19]

Hitt

[11] 4,334,605

[45] Jun. 15, 1982

[54] TECHNIQUE FOR HANDLING AND TREATING HEAVY WASTE HYDROCARBONS

[76] Inventor: Franz A. Hitt, 345 Clifford, Corpus Christi, Tex. 78404

[21] Appl. No.: 225,738

[22] Filed: Jan. 16, 1981

[51] Int. Cl.³ ............................................ C10G 21/14
[52] U.S. Cl. ..................................... 196/46; 196/155; 208/177; 261/18 B; 366/339
[58] Field of Search ................. 196/46, 155; 122/487; 261/18 B; 210/221.2, 781; 208/177; 366/338, 339

[56] References Cited

U.S. PATENT DOCUMENTS

| | | | |
|---|---|---|---|
| 606,783 | 7/1898 | Henderson | 261/18 B X |
| 1,601,727 | 10/1926 | Faragher et al. | 366/388 X |
| 1,668,104 | 5/1928 | Colwell | 196/155 |
| 1,716,974 | 6/1929 | Payne | 196/46 |
| 1,756,026 | 4/1930 | Huff | 196/46 X |
| 2,099,824 | 11/1937 | Reeves et al. | 196/46 |
| 2,223,999 | 12/1940 | Miller | 208/177 X |
| 2,312,112 | 2/1943 | McNealy | 196/46 X |
| 2,677,666 | 5/1954 | Dougherty | 208/177 X |
| 3,847,751 | 11/1974 | Godino et al. | 196/155 |
| 4,231,459 | 11/1980 | Sequeira, Jr. et al. | 196/46 |

Primary Examiner—Richard L. Chiesa
Attorney, Agent, or Firm—G. Turner Moller

[57] ABSTRACT

An apparatus is provided for handling and treating heavy waste hydrocarbons. The device comprises a pit heater for at least partially liquifying the hydrocarbon waste to render it pumpable. A positive displacement pump has its inlet adjacent the pit heater and pumps and partially liquified material out of a pit and into a heater-blender. In the heater-blender, a relatively high gravity crude oil is mixed with the heavy hydrocarbon waste and the temperature of the mixture is elevated by injecting steam thereinto. The blend exiting from the heater-blender is on the order of 200° F. The hydrocarbon component of the blended material is in the range of 15°–25° API. The blend is discharged into a holding tank which has the capacity for reheating the material if necessary. The blend is withdrawn from the storage tank and processed to break the water-hydrocarbon emulsion and remove the water therefrom.

15 Claims, 4 Drawing Figures

TECHNIQUE FOR HANDLING AND TREATING HEAVY WASTE HYDROCARBONS

There exists in various places pits containing tar and waste oil which is presently worthless and which comprises a pollution hazard to soil, ground water and the like. An example of this situation are pits containing tar and heavy oils located in various oil fields scattered across the United States. Another example occurs where heavy hydrocarbon wastes have been buried as has occurred where refineries have been shut down and dismantled or where such waste have been delivered for injection into the earth but have instead been buried.

The quantity of wastes in any particular location varies as does the composition of the waste hydrocarbon material. Several examples may illustrate the scope of the problem and the difficulties encountered in recovering this hydrocarbon waste and in cleaning up the pit.

Near La Pryor, Texas, a very low gravity crude oil has been produced from a number of wells over the years. On the lease in question, there are four pits containing an aggregate of about 40,000 barrels of an oil-water emulsion containing weathered hydrocarbon tar. On a relatively cool day, a 200 pound individual can walk on the pit without sinking. This tar has the consistency of putty.

Near Brownsville, Texas, there is a pit containing perhaps 200,000 barrels of heavy weathered hydrocarbons that were removed from the holds of tankers. Although it is not a solid as in the previous example, the hydrocarbon material is very viscous. Various schemes have been proposed for reclaiming this material. To date, none have been successful.

Near Corpus Christi, Texas, something in excess of 10,000 barrels of a heavy hydrocarbon waste was delivered to an injection site for disposal into a well extending into the earth. For reasons not altogether clear, the waste material was buried in a trench rather than injected into the disposal well.

In all of these situations, there exists both a problem and an opportunity. The problem is that the heavy hydrocarbon zaste constitutes a potential pollution hazard to soil and ground water. The opportunity is that the hydrocarbon material, if recovered and separated from water and non-hydrocarbon solids, can be quite valuable.

Although the heavy hydrocarbon waste existing in the situations such as described previously varies substantially in composition, typically the waste material comprises an oil-water emulsion, some free water, some suspended non-hydrocarbon solids and possibly some suspended hydrocarbon solids. The hydrocarbons present in the emulsion are normally quite weathered, i.e. all or substantially all of the hydrocarbons which are capable of vaporizing at ambient temperature and pressure have long since vaporized and escaped. Accordingly, the hydrocarbons in the emulsion typically are of high density or low API gravity. It is not unusual, for example, for the hydrocarbons in the emulsion to have an API gravity of less than 10, which means that the hydrocarbons are as dense or denser than water present in the emulsion. This, of course, makes the emulsion exceedingly difficult to break since one cannot, without some type of unusual treatment, rely upon the normal density difference between water and liquid hydrocarbons to break the emulsion.

The technique of this invention may be used to reclaim these and other hydrocarbon wastes. The first problem to be addressed is to remove the hydrocarbons from the earthen pits or trenches in which they reside. Although many different techniques are theoretically feasible, a practical technique has to have the capability of removing quite viscous, but liquid, hydrocarbons as well as hydrocarbons which are substantially solid at ambient temperatures.

In accordance with this invention, there is provided a pit heater which not only circulates steam in the area to be heated but which also injects live steam into the pit to both heat and agitate the heavy waste hydrocarbons. The suction of a pump is disposed in the heated area so that the liquified material may be pumped from the earthen pit. In this fashion, hydrocarbon materials which are either viscous liquids or substantially solid at ambient temperatures may be pumped from the earthen pit.

It may be appreciated that the material delivered from the pump outlet typically comprises the hydrocarbon-water emulsion which has existed in the earthen pit in addition to water condensed from the injected steam and some low grade steam. If this material were allowed to cool to ambient temperature in a tank, without prior treatment, it would be as difficult to pump as the material originally in the pit. It is accordingly highly desirable to treat the mixture delivered from the pump outlet as soon as possible after delivery from the pump outlet in a manner that will leave the material either pumpable after cooling to ambient temperature or substantially easier to render pumpable.

To this end, this invention comprises a blender/heater into which the pumped mixture is delivered along with a significant portion of hydrocarbon mixing material that is substantially wholly miscible with the hydrocarbon phase of the emulsion originally in the earthen pit. The blend produced by mixing the pumped material from the pit and the hydrocarbon mixing material not only facilitates later handling of the material but also promotes subsequent breaking of the oil-water emulsion.

It is accordingly an object of this invention to provide a technique for reclaiming hydrocarbons from heavy waste hydrocarbon materials.

Another object of the invention is to provide an efficient technique for removing heavy hydrocarbon materials from earthen pits or tanks in which the hydrocarbon material may be either a quite viscous liquid or substantially solid at ambient temperatures.

Other objects and advantages of the invention will become more fully apparent as this description proceeds, reference being made to the accompanying drawings and claims.

IN THE DRAWINGS

Figure 1:
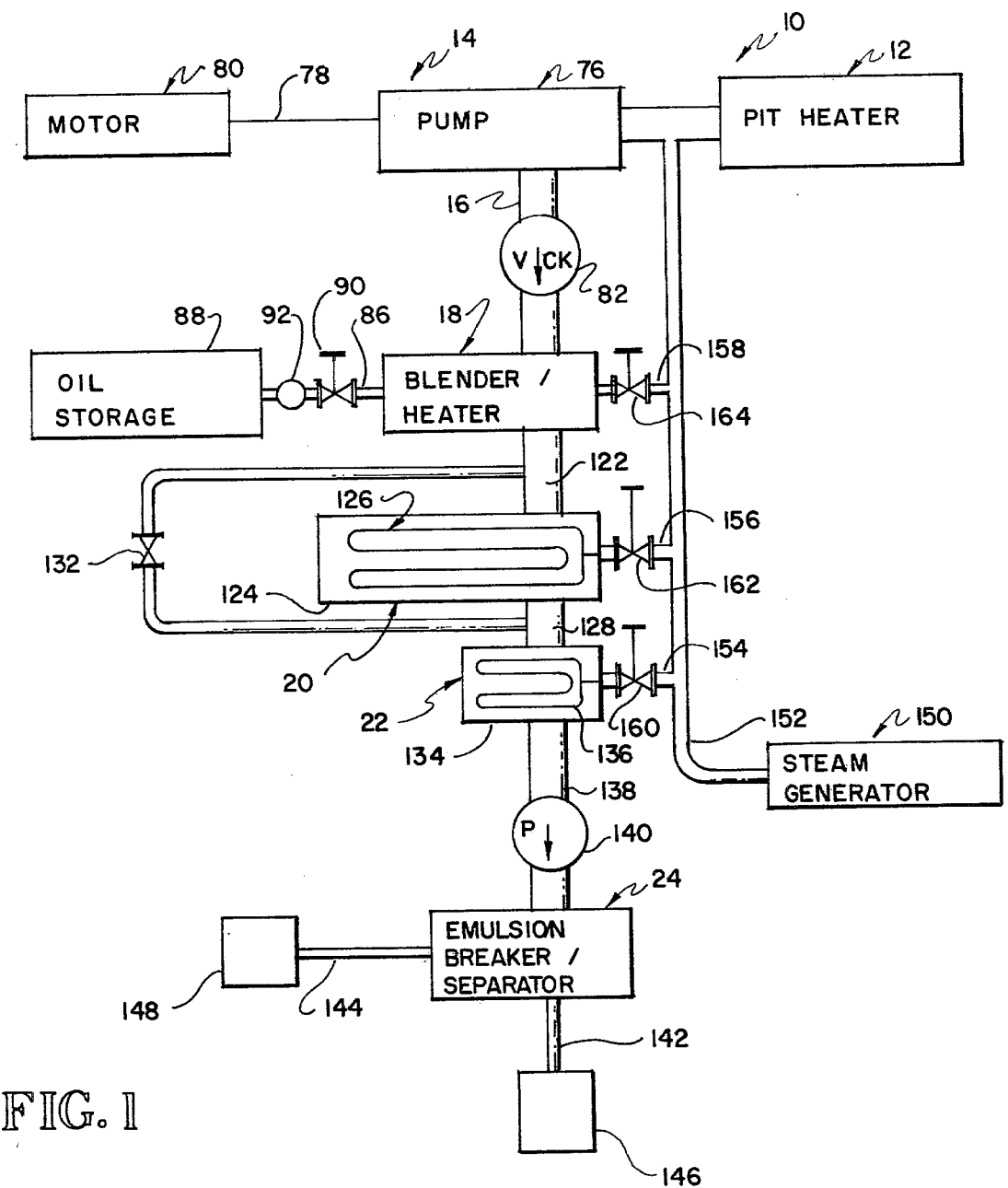
FIG. 1 is a schematic view of a system of this invention.

Referring to FIG. 1, the system 10 of this invention comprises, as major components, a pit heater 12 for agitating and heating heavy hydrocarbon materials existing in an earthen pit, a pump assembly 14 for delivering the heated hydrocarbon material through a flow line 16 to a blender/heater 18, a storage facility 20 for temporarily accumulating heavy hydrocarbon material delivered from the pit, a heating box 22 for heating material withdrawn from storage and an emulsion breaker or separator 24 for separating the heavy hydrocarbon material into a first component comprising substantially water and a second component comprising substantially wholly hydrocarbons.

Broadly, the technique of this invention is to use the pit heater 12 to reduce the viscosity of the heavy hydrocarbon materials, and pump the liquified material into the blender/heater 18. In the blender/heater, a second hydrocarbon material which is substantially wholly miscible with the hydrocarbons from the waste material is mixed with the waste material. Typically, the hydrocarbon blending material is selected to be substantially lighter, or have a substantially higher API gravity, than the hydrocarbons in the waste material.

This has two primary advantages. First, the oil water emulsion present in the material exiting from the blender/heater 18 is substantially easier to break since there exists a density difference between the hydrocarbon and water phase. Second, even if the material exiting from the blender/heater is allowed to cool to ambient temperature, as may occur in the storage facility 20, it is substantially easier to reliquify or restart pumping of the blended material.

When it is desired to deliver product from the system 10, the heating box 22 is utilized to additionally heat the material being treated which is delivered to the emulsion breaker 24. Oil and water are separately withdrawn from the emulsion breaker 24. The hydrocarbon component delivered from the emulsion breaker 24 typically has an API gravity of at least 15°. The upper limit of API gravity on produced hydrocarbons from the device 10 depends, of course, on the initial hydrocarbon composition existing in the pit along with the proportion and API gravity of the blend oil added in the blender 18.

Figure 2:
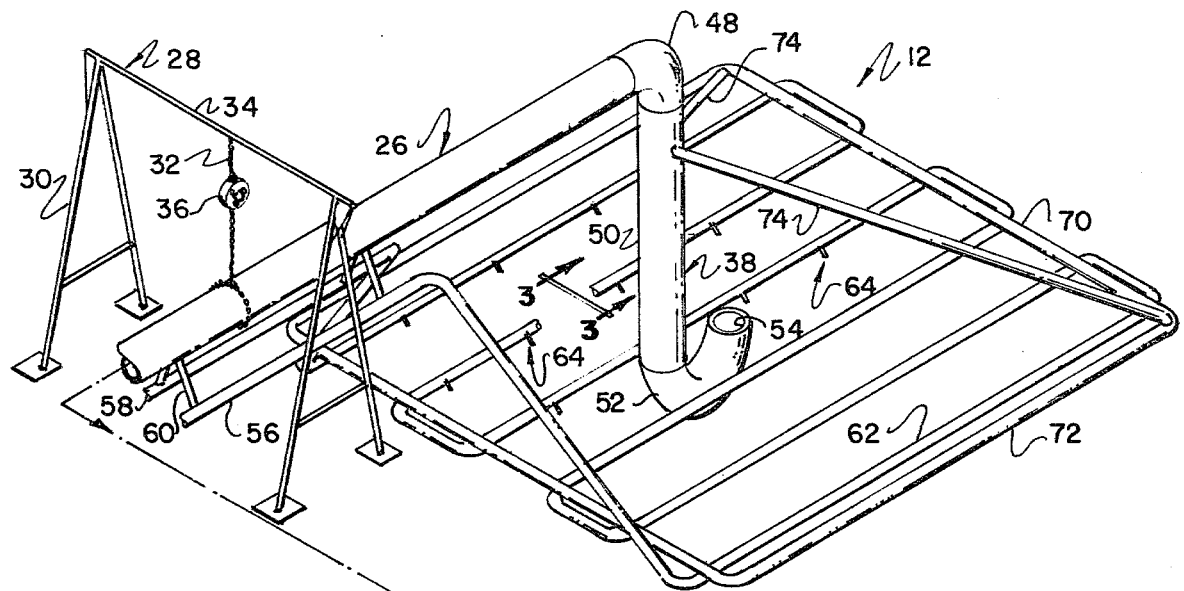
FIG. 2 is an isometric view of a pit heater in accordance with the principles of this invention.
Figure 2:
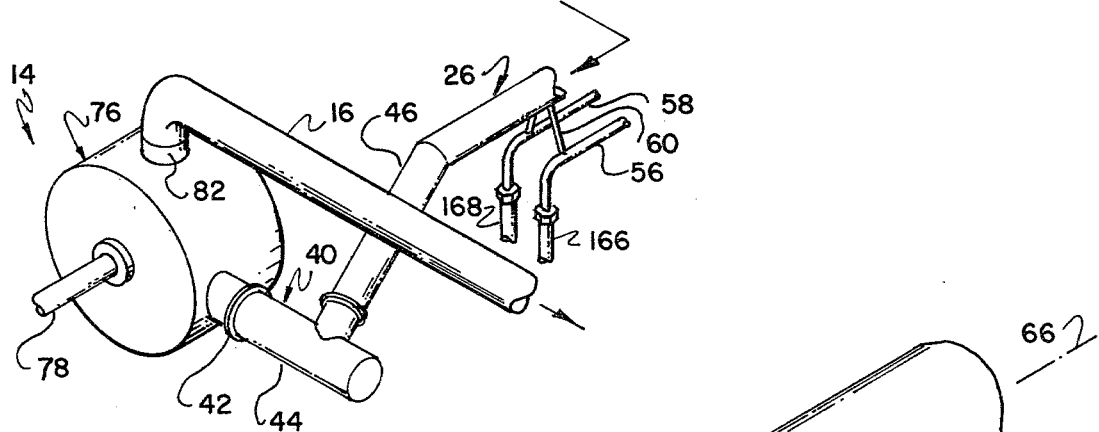
Figure 3:
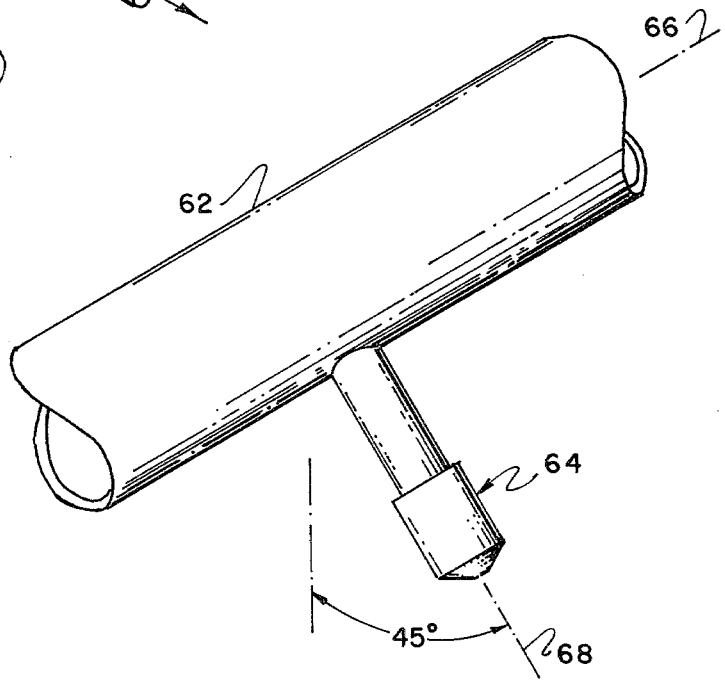
FIG. 3 is an enlarged isometric view of one detail of the pit heater of FIG. 2.

Referring to FIG. 2, the pit heater 12 is illustrated in substantially greater detail. The pit heater 12 comprises an elongate conduit 26 which acts both as a support and as a means for carrying liquified waste material toward the pump assembly 14. Means 28 are provided for raising and lowering the conduit 26. The raising and lowering means 28 may be of any suitable type and is illustrated as a rudimentry A-frame 30 having a chain 32 connecting the cross bar 34 to the conduit 26. A comealong 36 or other suitable device may be used to wind up the chain 32 to raise or lower the conduit 26.

In the illustrated embodiment, the conduit 26 is arranged to be pivoted to allow raising and lowering of the suction end 38. To accommodate this pivotal movement, the discharge end 40 of the conduit 26 comprises a swivel connection 42 connected to the pump assembly 14 and a blind tee 44 connected to the swivel connection 42. For purposes of convenience, the conduit 26 includes an angled section 46 connected to the blind tee 44.

The central part of the conduit 26 is conveniently straight and connects to an ell 48 secured, as by welding or the like, to a downcomer 50 comprising part of the suction end 38. The downcomer 50 is conveniently welded to a 180° section 52 having an open end 54.

A pair of steam lines 56, 58 extend under the conduit 26 and are secured thereto by suitable struts 60. Near the end of the linear conduit section, the steam lines 56, 58 diverge downwardly and connect with opposite ends of a tortuous steam distribution conduit 62 which conveniently resides in a plane at or slightly below the open conduit end 54. A multiplicity of steam delivery nozzles 64 are positioned in the conduit 62, conveniently at regular intervals. The steam delivery nozzles 64 are inclined downwardly from the axis 66 of the conduit 62, preferably at a 45° angle. Those steam delivery nozzles to the left of the open conduit end 54, as shown in FIG. 2, incline to the right so that the axis 68 of the nozzles 64 pass below the open conduit end 54. Those nozzles 64 to the right of the open conduit end 54, as may be seen from FIG. 2, incline to the left so that the axes 68 of the nozzles 64 pass below the open conduit end 54.

The existance and the arrangement of the steam delivery nozzles 64 substantially facilitates heating and liquification of the heavy hydrocarbon material to be pumped for a variety or reasons. First, steam exiting from the nozzles 64 obviously heats the heavy hydrocarbon material and reduces the viscosity thereof. Second, there is considerable agitation of the heavy hydrocarbon material which also promotes heat transfer and liquification. Third, the direction of the nozzles 64 causes the hydrocarbon material to move in a direction toward and underneath the open conduit end 54. Accordingly, even in a pit containing substantially solid hydrocarbon materials, a pool of liquified hydrocarbons exists in the center of the area traversed by the steam distribution conduit 62.

As a support for the steam distribution conduit, there is provided a framework 70. The framework 70 conveniently comprises a tube 72 of rectilinear configuration which abuts the steam distribution conduit and is secured thereto in any suitable fashion, as by welding or the like. Suitable struts 74 connect the framework 70 and the downcomer 50 to provide additional rigidity.

Referring to FIGS. 1 and 2, the pump assembly 14 comprises a pump 76 of any suitable type. Although the pump 76 may be of the centrifugal type it is preferred to use a positive displacement pump since the hydrocarbon material delivered through the conduit 26 is typically quite viscous and difficult to pump. A shaft 78 connects the pump 76 to a motor 80 for driving the pump 76. Although the motor 80 may be of the electrically driven type, it is preferably an internal combustion engine since electric power is not always available adjacent the waste hydrocarbon material to be reclaimed.

The pump 76 includes a discharge 82 connected to the flow line 16 which desirably has a check valve 82 therein. The flow line 16 is connected to the inlet 84 of the blender 18 by use of a releasable coupling 85 such as a union or the like, as shown best in FIG. 4.

The blender inlet 84 connects to a blend oil conduit 86 leading to an oil storage tank 88 and has therein a valve 90 and oil pump 92.

Figure 4:
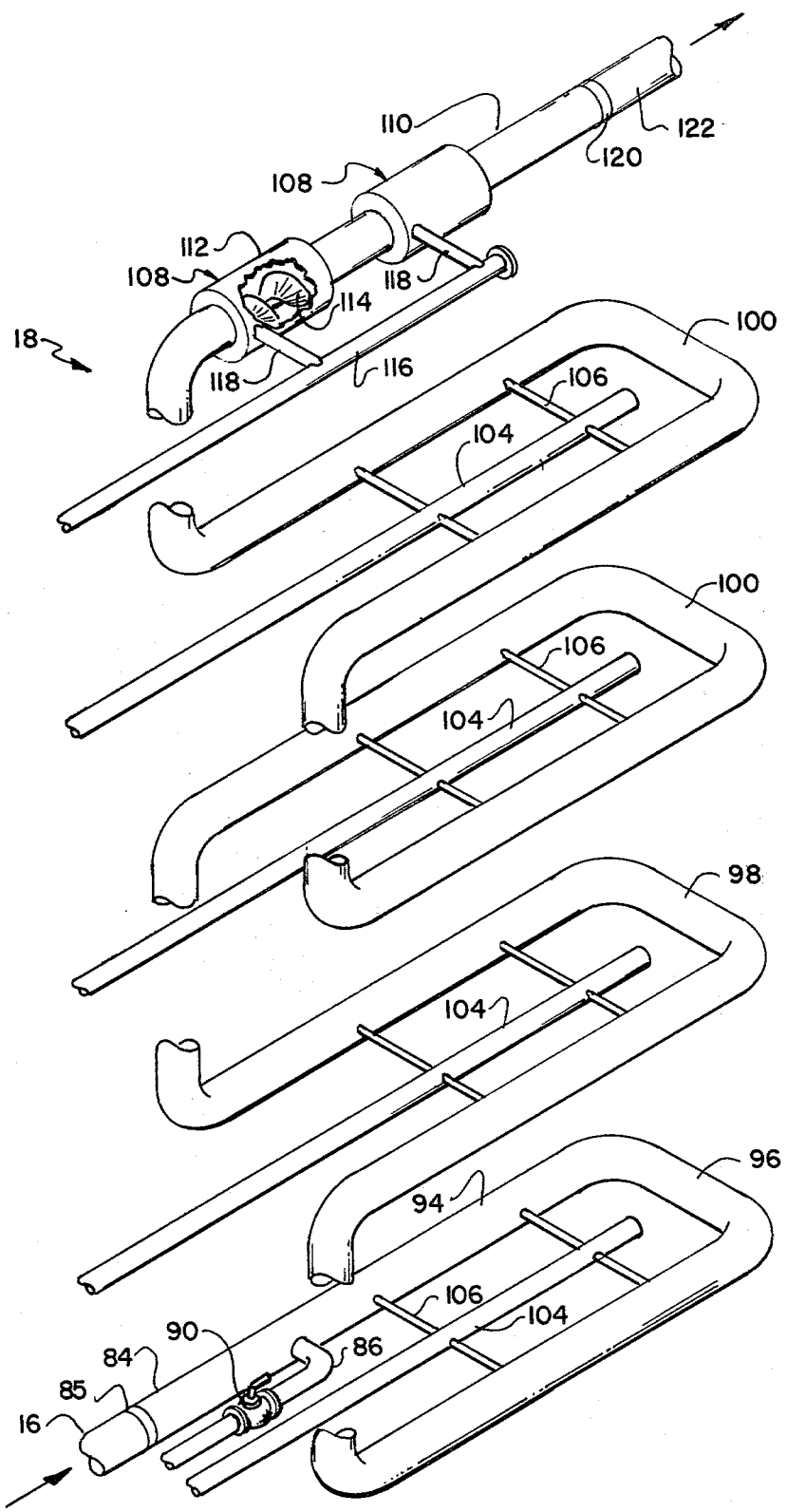
FIG. 4 is a broken isometric view of the blender/heater of FIG. 1.

As shown best in FIG. 4, the blender/heater 18 comprises a conduit 94 arranged in a series of superposed runs 96, 98, 100, 102 so that the blender/heater 18 may be fabricated on a skid for portability. In order to heat the waste hydrocarbon material and the blend oil, steam is injected into the conduit 94, preferably at a multiplicity of spaced locations on each of the runs 96, 98, 100, 102. To this end, there is provided a steam line 104 for each of the runs 96, 98, 100, 102. Each of the steam lines 104 includes a plurality of distribution branches 106 providing communication between the steam line 104 and the conduit 94. It will accordingly be seen that the steam injected into the conduit 94 not only heats the material passing therethrough but also agitates it thereby substantially promoting mixing of the blend oil and the heavy waste hydrocarbon material.

To further the mixing operation, there is provided a plurality of mixing stations 108 in the conduit 94, preferably adjacent the discharge end 110 thereof. Each of the mixing stations 108 includes a shell 112 of slightly greater diameter than the conduit 94 having therein a screw or helix 114 to impart a swirl to the mixture passing through the conduit 94. A steam line 116 includes a branch 118 opening into the shell 112 adjacent the upstream end thereof.

The blender/heater 18 terminates in a releasable coupling 120, such as a union or the like, on the discharge end 110. The coupling 120 connects the conduit 94 to a flow line 122 leading from the blender/heater 18 to the storage facility 20. It will be appreciated that the blender/heater 18 is fabricated on a skid. Since the releasable couplings 85, 120 allow disconnection of the blender/heater 18 from the flow lines 16, 122, the blender/heater 18 is sufficiently portable to be moved from one location to another where the waste hydrocarbon materials exist.

Referring to FIG. 1, the storage facility 20 may be of any suitable type. In one prototype of the invention which has been constructed, the storage facility 20 comprises a rectangular open top 500 barrel tank 124 which is known in the oil field as a frac tank. The tank 124 has been modified to provide a steam distribution system 126 therein so that material delivered from the blender/heater 18 may be maintained at a sufficient temperature during continuous operations or that the material may be reliquified in the event the system 10 is shut down.

A flow line 128 connects the storage facility 20 to a heating box 22 of conventinal design. If desired, a by-pass conduit 130 having a valve 132 therein may be provided. In the event that the emulsion breaker 24 is operating at a rate sufficient to immediately accept all material delivered from the blender/heater 18, the blended material may be directed immediately to the heating box 22 without passing through the storage facility 20.

The heating box 22 is of conventional design and includes a closed receptacle 134 which is typically quite small compared to the tank 124. Typically, the receptacle 134 is sized to hold less than the hourly capacity of the emulsion breaker 24. The receptacle 134 includes therein a steam distribution system 136 for heating the blended material passing therethrough.

The heating box 22 is connected by a flow line 138, having a pump 140 therein, to the emulsion breaker 24. Although the emulsion breaker 24 may be of any suitable type, it is desirably a high capacity commercially available centrifuge. Since the hydrocarbon phrase of the mixture entering the emulsion breaker 24 is of substantially lower density, or higher API gravity, commercially available centrifuges are effective to separate the hydrocarbon component from the water component. It will be appreciated that such centrifuges would not be effective without mixing a substantial portion of miscible relatively high gravity oil with the hydrocarbon material. The exact proportion of blend oil varies substantially depending on a variety of factors. It should initially be realized that it is desired to minimize the amount of blend oil commensurate with the requirement of sufficiently raising the API gravity of the hydrocarbon component in the blended material. The exact minimum rate of blend oil addition may be readily determined from:

$$\rho_1 A + \rho_2 B = \rho_3 (A+B) \tag{1}$$

where $\rho_1$ is the specific gravity of the blend oil, $\rho_2$ is the specific gravity of the hydrocarbon component in the waste material and $\rho_3$ is the desired specific gravity of the hydrocarbon component after blending, A is the hourly volume of blend oil delivered to the blender/heater 18 and B is the hourly volume of waste material delivered to the blender/heater 18.

The value of $\rho_3$ is dictated by the chracteristics of the centrifuge comprising the emulsion breaker 24 and may be determined by the manufacturer thereof. The values of $\rho_1$ and $\rho_2$ may be measured. Since the hourly volume B can be estimated or determined, equation (1) may readily be solved for the hourly volume A of blend oil that is required. It will be evident that A is the minimum hourly requirement and some additional blend oil may be used to provide assurance that the minimum density is always exhibited by the blended material.

The emulsion breaker 24 includes a hydrocarbon discharge 142 and a water discharge 144 which conveniently lead to holding tanks 146, 148 respectively. It will be appreciated that oil and water accumulated in the tanks 146, 148 may be trucked away from the location for sale and disposal in a conventional manner.

Also comprising part of the system 10 of this invention is a steam generator 150 of any suitable type having an output conduit 152 connected by branch lines 154, 156, 158 having valves 160, 162, 164 therein leading respectively to the steam distribution system 136 in the heater box 22, to the steam distribution system 126 in the storage facility 20 and to the steam lines 104 of the blender/heater 18. The steam outlet conduit 152 also connects to the pit heater 12 in any suitable fashion, as to a manifold (not shown) having a pair of outlet conduits 166, 168 connected to the steam lines 56, 58 as shown in FIG. 2.

Although the invention has been described in its preferred form with a certain degree of particularity, it is understood that the present disclosure of the preferred form has been made only by way of example and that numerous changes in the details of construction and combination and arrangement of parts may be resorted to without departing from the spirit and scope of the invention as hereinafter claimed. It is intended that the patent shall cover, by suitable expression in the appended claims, whatever features of patentable novelty exists in the invention disclosed.

I claim:

1. A system for recovering hydrocarbons from a heavy hydrocarbon waste having water therein, from a pit, comprising a pit heater for at least partially liquifying the heavy hydrocarbon waste and means for lowering the pit heater into the pit;

a pump having an inlet carried by the pit heater for withdrawing the hydrocarbon waste from the pit and an outlet;

a blender for mixing the hydrocarbon waste with a mixing oil of higher API gravity having an inlet connected to the pump outlet and an outlet, including a storage tank for holding a mixing oil of higher API gravity than the waste, means for injecting the mixing oil into the blender, and means for heating the mixed hydrocarbon waste and the mixing oil; and means, in material receiving relation with the blender outlet, for separating water from the mixed hydrocarbon waste and mixing oil.

2. The system of claim 1 wherein the pit heater comprises a steam conduit having a plurality of steam exit nozzles therein for injecting steam below the level of hydrocarbon waste in the pit and a steam generator connected to the steam conduit for delivering steam thereinto.

3. The system of claim 2 wherein the steam conduit describes a tortuous course within the confines of a heated volume, the pump inlet being located in the heated volume, the steam exit nozzles being directed inwardly and downwardly away from the periphery of the heated volume.

4. The system of claim 1 wherein the blender further comprises a conduit in material transferring relation to the pump outlet and to the storage tank and the heating means comprises means for injecting steam into the conduit at spaced locations along the length thereof.

5. The system of claim 4 wherein the conduit comprises sections therein having a plurality of baffles transverse to the direction of flow through the conduit and the steam injecting means includes means for injecting steam into the baffle sections.

6. The system of claim 1 further comprising a storage tank, connected with the blender outlet, for storing mixed hydrocarbon waste and mixing oil;

a heating box in material receiving relation with the storage tank and material discharging relation to the separating means for heating the mixed hydrocarbon waste and mixing oil; and means for heating the storage tank and mixing box.

7. The system of claim 6 further comprising a bypass conduit, around the storage tank extending from downsteam of the blender to downsteam of the storage tank.

8. The system of claim 1 wherein the separating means is a centrifuge.

9. Apparatus for reducing the viscosity and promoting the pumpability of a heavy hydrocarbon waste, having water wherein, located in a pit in the earth, comprising an elongate support, capable of extending from a bank on one side of the pit across the edge of the pit, having a bank side and a pit side;

a pump suction carried by the support on the pit side;

a steam line carried by the support and extending from the bank side to the pit side;

steam distribution means, carried by the support on the pit side, in steam receiving relation with the steam line, the steam distributing means comprising a series of spaced steam conduit sections on opposite sides of the pump suction, and a multiplicity of steam exit nozzles in the conduit sections for injecting steam into the hydrocarbon waste for heating and agitating the same; and means, on the bank side of the support, for raising and lowering the support relative to the pit.

10. The apparatus of claim 9 wherein the steam conduit sections are generally coplanar and the steam exit nozzles extend downwardly relative to the plane.

11. The apparatus of claim 10 wherein the steam exit nozzles are inclined between the horizontal and vertical, the nozzles being inclined toward a vertical plane intersecting the pump suction.

12. The apparatus of claim 11 wherein the pump suction comprises an inlet above the plane of the steam conduit sections.

13. The apparatus of claim 9 further comprising a pump on the bank side, the support comprising a conduit connecting the pump suction to the pump.

14. Apparatus for recovering hydrocarbon values from a mixture of heavy hydrocarbons and water, comprising a receptacle for receiving the mixture of heavy hydrocarbons and water having means for heating the mixture including a steam line having a plurality of steam exit locations opening into the receptacle and means for delivering steam into the steam line;

means for pumping the mixture out of the receptacle and delivering the same into a conduit;

means operatively connected with the conduit for receiving the mixture and for increasing the API gravity of the hydrocarbon component of the mixture including a source of liquid hydrocarbons substantially wholly miscible with the hydrocarbon component of the mixture and having an API gravity greater than the hydrocarbon component of the mixture; means for blending the higher API gravity hydrocarbon with the mixture; and means for delivering the higher API gravity hydrocarbon into the blending means;

means for heating the mixture downstream of the blending means; and means downstream of the heating means for separating the mixture into water and hydrocarbon components.

15. The apparatus of claim 14 wherein the blending means comprises a conduit formed in a series of runs having a mixture inlet, a mixture outlet, a plurality of sections therein providing baffles transverse to the direction of flow through the conduit, and an inlet for the higher API gravity hydrocarbon located adjacent the mixture inlet; and a steam generator and means for injecting steam into the conduit at a multiplicity of spaced locations.

* * * * *